(12) United States Patent
Arata

(10) Patent No.: US 7,096,100 B2
(45) Date of Patent: Aug. 22, 2006

(54) VEHICLE-MOUNTED APPARATUS AND GUIDANCE SYSTEM

(75) Inventor: Koji Arata, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 306 days.

(21) Appl. No.: 10/797,330

(22) Filed: Mar. 10, 2004

(65) Prior Publication Data

US 2004/0181324 A1    Sep. 16, 2004

(30) Foreign Application Priority Data

Mar. 11, 2003 (JP) ............... 2003-064897
Jan. 30, 2004 (JP) ............... 2004-022907

(51) Int. Cl.
*G08G 1/09* (2006.01)
*G01C 21/32* (2006.01)

(52) U.S. Cl. .................. 701/23; 701/2; 701/205; 701/211; 340/905; 340/995.27; 455/414.2; 455/456.3

(58) Field of Classification Search .......... 701/2, 701/23, 207, 213, 205, 200, 211; 455/414.2, 455/414.3, 3.02, 414, 456.2, 456.3, 456.6, 455/41, 422, 33, 34, 56; 340/905, 928, 995.25, 340/995.27, 995.19
See application file for complete search history.

(56) References Cited

U.S. PATENT DOCUMENTS

| 5,493,291 | A  | * | 2/1996  | Bruggemann ........... 340/905 |
| 5,777,565 | A  | * | 7/1998  | Hayashi et al. ........ 340/928 |
| 6,144,318 | A  | * | 11/2000 | Hayashi et al. ....... 340/995.19 |
| 6,252,544 | B1 | * | 6/2001  | Hoffberg ............. 342/357.1 |
| 6,266,609 | B1 | * | 7/2001  | Fastenrath ............. 701/200 |
| 6,968,181 | B1 | * | 11/2005 | Ishidoshiro .......... 455/414.2 |
| 2003/0036379 | A1 | * | 2/2003 | Nikolai et al. .......... 455/414 |

FOREIGN PATENT DOCUMENTS

JP        2001-109989 A     4/2001

* cited by examiner

*Primary Examiner*—Tan Q. Nguyen

(57) ABSTRACT

A guidance system includes a vehicle-mounted apparatus. A sensor-signal input unit inputs a vehicle-sensor signal for acquiring a vehicle status. A determining unit determines a movement of the vehicle on the basis of the vehicle-sensor signal inputted from the sensor-signal input unit. A guidance-information acquiring unit acquires guidance information from an external apparatus through a communication apparatus mounted on the vehicle. An information selecting unit selects guidance information acquired by the guidance-information acquiring unit depending upon a vehicle movement determined by the determining unit. An output unit outputs guidance information selected by the information selecting unit.

12 Claims, 7 Drawing Sheets

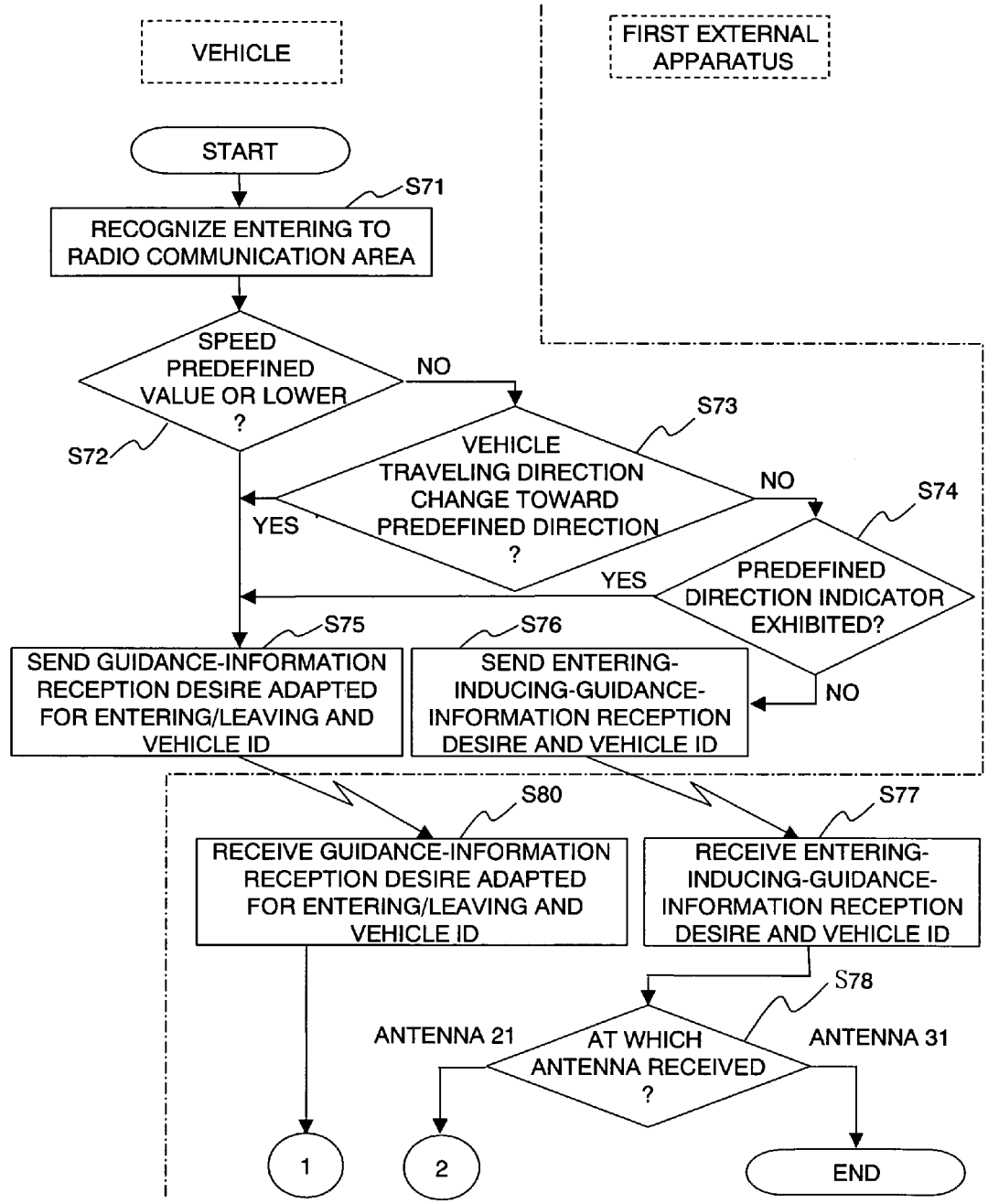

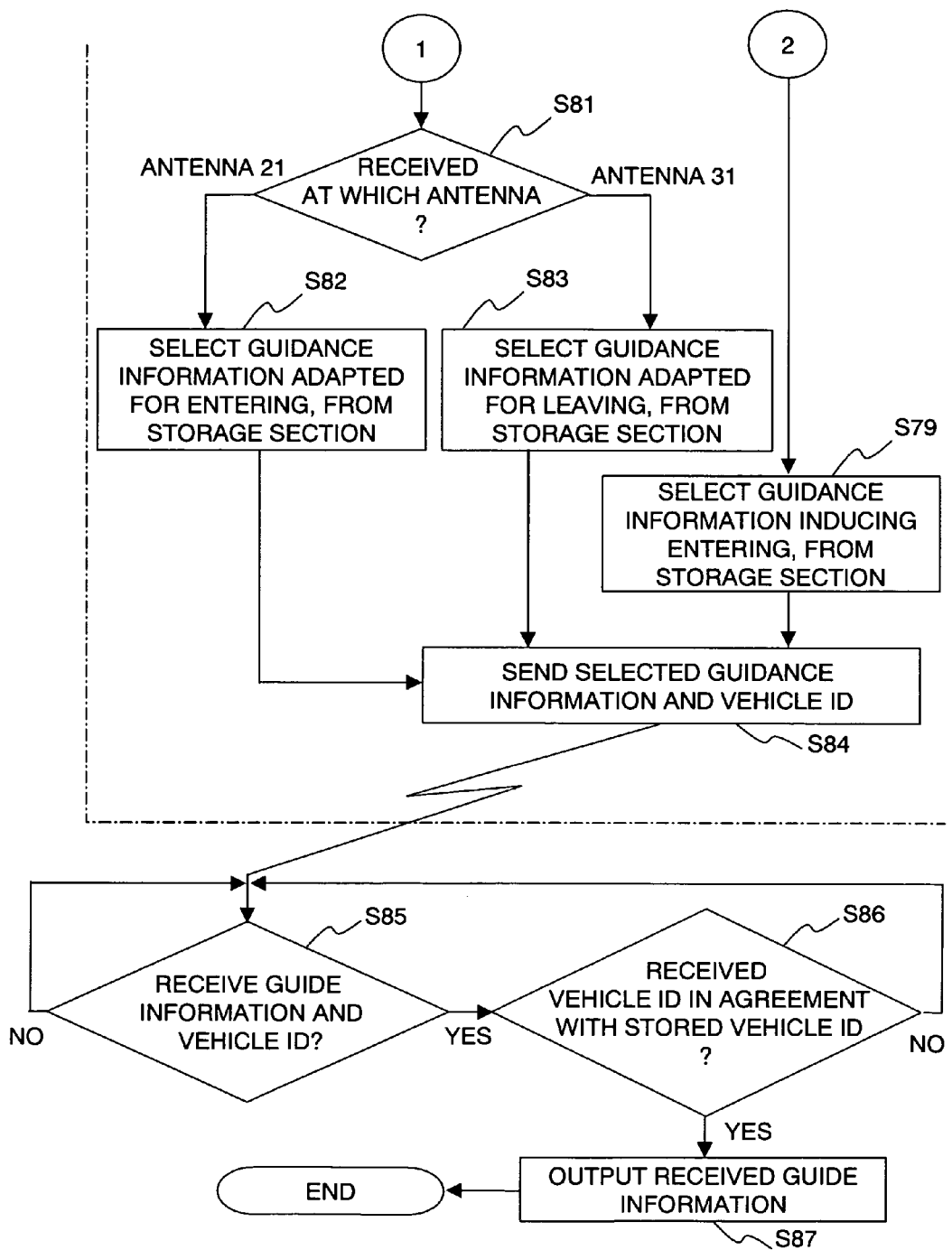

VEHICLE-MOUNTED APPARATUS AND GUIDANCE SYSTEM

FIELD OF THE INVENTION

The present invention relates to a guidance system constituted with a vehicle-mounted apparatus for outputting the guidance information acquired from an external apparatus through use of radio communications and an external apparatus for exchanging data with the vehicle-mounted apparatus.

BACKGROUND OF THE INVENTION

There is described one example of the conventional vehicle-mounted apparatus, for example, in JP-A-2001-109989.

The conventional vehicle-mounted apparatus is configured with communication means for carrying out communications by DSRC (Dedicated Short Range Communication), information acquiring means for acquiring information, display means for displaying information acquired, input means for inputting operations, and response means for sending input operation information through the communication means. The conventional vehicle-mounted apparatus allows the user to make various operations according to the information to enjoy the service acquired from a fixed station through DSRC-based communications, enabling to enjoy a diversity of services individually.

However, in order to receive suitable information on the conventional vehicle-mounted apparatus, the user is forced to make the operations of information selection one by one in accordance with the information being displayed. This possibly raises troublesomeness.

SUMMARY OF THE INVENTION

The present invention provides a vehicle-mounted apparatus which can present suitable information to the user without the necessity for the user to make the operations of information selection one by one according to the information displayed.

A vehicle-mounted apparatus of the present invention includes sensor-signal input means, determining means, guidance-information acquiring means, information selecting means and output means. The sensor-signal input means inputs a vehicle-sensor signal for acquiring a vehicle status. The determining means determines a movement of the vehicle on the basis of the vehicle-sensor signal inputted from the sensor-signal input means. The guidance-information acquiring means acquires guidance information from an external apparatus through a communication apparatus mounted on the vehicle. The information selecting means selects guidance information acquired by the guidance-information acquiring means, depending upon a vehicle movement determined by the determining means. The output means outputs guidance information selected by the information selecting means.

By this arrangement, outputted is only guidance information suited for the current status of among the guidance information received, on the basis of a vehicle-sensor signal inputted from the sensor-signal input means. Accordingly, only the guidance information suited for the status can be outputted without the necessity for the user to carry out information selecting operation through the input means.

Meanwhile, a vehicle-mounted apparatus of the invention includes sensor-signal input means, determining means, movement presenting means, guidance-information acquiring means and output means. The sensor-signal input means inputs a vehicle-sensor signal for acquiring a vehicle status. The determining means determines a movement of the vehicle on the basis of the vehicle-sensor signal inputted from the sensor-signal input means. The movement presenting means presents to the external apparatus a vehicle movement determined by the determining means through a transmission apparatus mounted on the vehicle. The guidance-information acquiring means acquires guidance information sent by the external apparatus on the basis of a vehicle movement presented by the movement presenting means, through a receiving apparatus mounted on the vehicle. The output means outputs guidance information acquired by the guidance-information acquiring means.

By this arrangement, received and outputted is only guidance information suited for the current status, on the basis of a vehicle-sensor signal inputted from the sensor-signal input means. Accordingly, only the guidance information suited for the status can be received and outputted without the necessity for the user to carry out information selecting operation through the input means.

BRIEF DESCRIPTION OF THE DRAWINGS

FIG. 6 is a flowchart showing the operation of the guidance system including the vehicle-mounted apparatus.

FIG. 7 is a flowchart showing the operation of the guidance system including the vehicle-mounted apparatus.

DESCRIPTION OF THE PREFERRED EMBODIMENT

Hereunder, embodiments of the present invention are explained with using the drawings.

Embodiment 1

Figure 1:
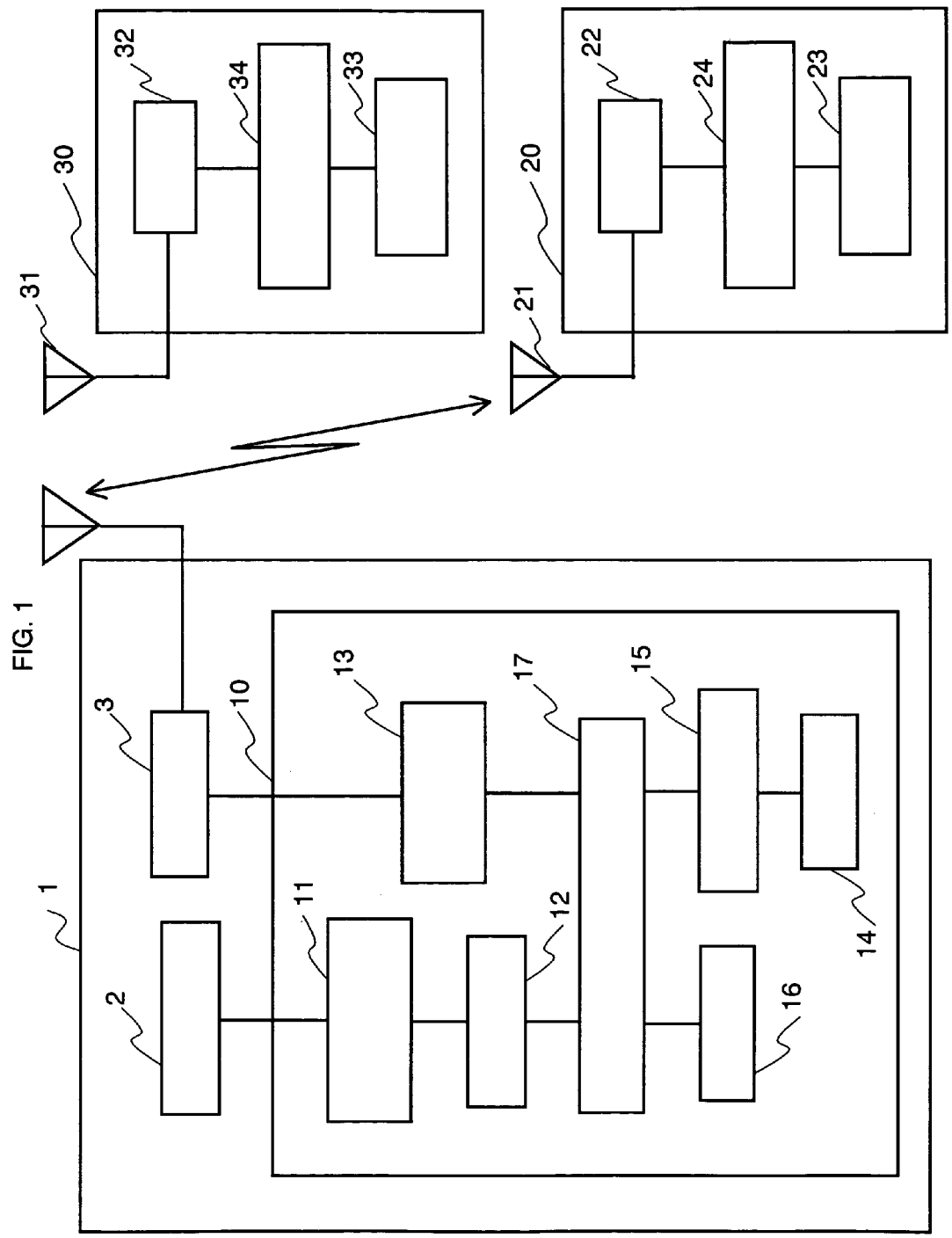
FIG. 1 is a block diagram of a guidance system including a vehicle-mounted apparatus in a first embodiment of the present invention.

FIG. 1 is a block diagram of a guidance system including a vehicle-mounted apparatus in a first embodiment of the present invention.

In FIG. 1, the guidance system of this embodiment comprises a vehicle-mounted apparatus 10 mounted on a vehicle 1, a first external apparatus 20 and a second external apparatus 30.

The vehicle-mounted apparatus 10 includes a sensor-signal input section 11, a determining section 12, a guidance-information acquiring section 13, a storage section 14, an information selecting section 15, an output section 16 and a main control section 17.

The sensor-signal input section 11 inputs a sensor signal acquired at the vehicle sensor 2, mounted on the vehicle 1 and for acquiring a vehicle status, such as a vehicle speed, a traveling direction change and a turn-signal state. The determining section 12 determines a vehicle movement, on the basis of a vehicle sensor's signal inputted from the sensor-signal input section 11. The guidance-information acquiring section 13 acquires guidance information from the first external apparatus 20 or second external apparatus 30 through a communication apparatus 3 mounted on the vehicle 1. A storage section 14 stores the guidance information the guidance-information acquiring section 13 have received from the first external apparatus 20 or second external apparatus 30. The information selecting section 15 selects information adapted for a vehicle 1 movement determined by the determining section 12 from among the guidance information stored in the storage section 14. The output section 16 outputs the guidance information the information selecting section 15 has selected, in the form of voice, characters or video image. The main control section 17 takes control of these sections.

The first external apparatus 20 has a radio section 22 for carrying out communications with the communication apparatus 3 mounted on the vehicle 1 through an antenna 21, a storage section 23 stored with guidance information to be sent to the communication apparatus 3 capable of implementing communications, and a main processing section 24 for sending, to the radio section 22, the guidance information stored in the storage section 23 according to a signal from the radio section 22. The second external apparatus 30 has the similar function to the first external apparatus.

Figure 2:
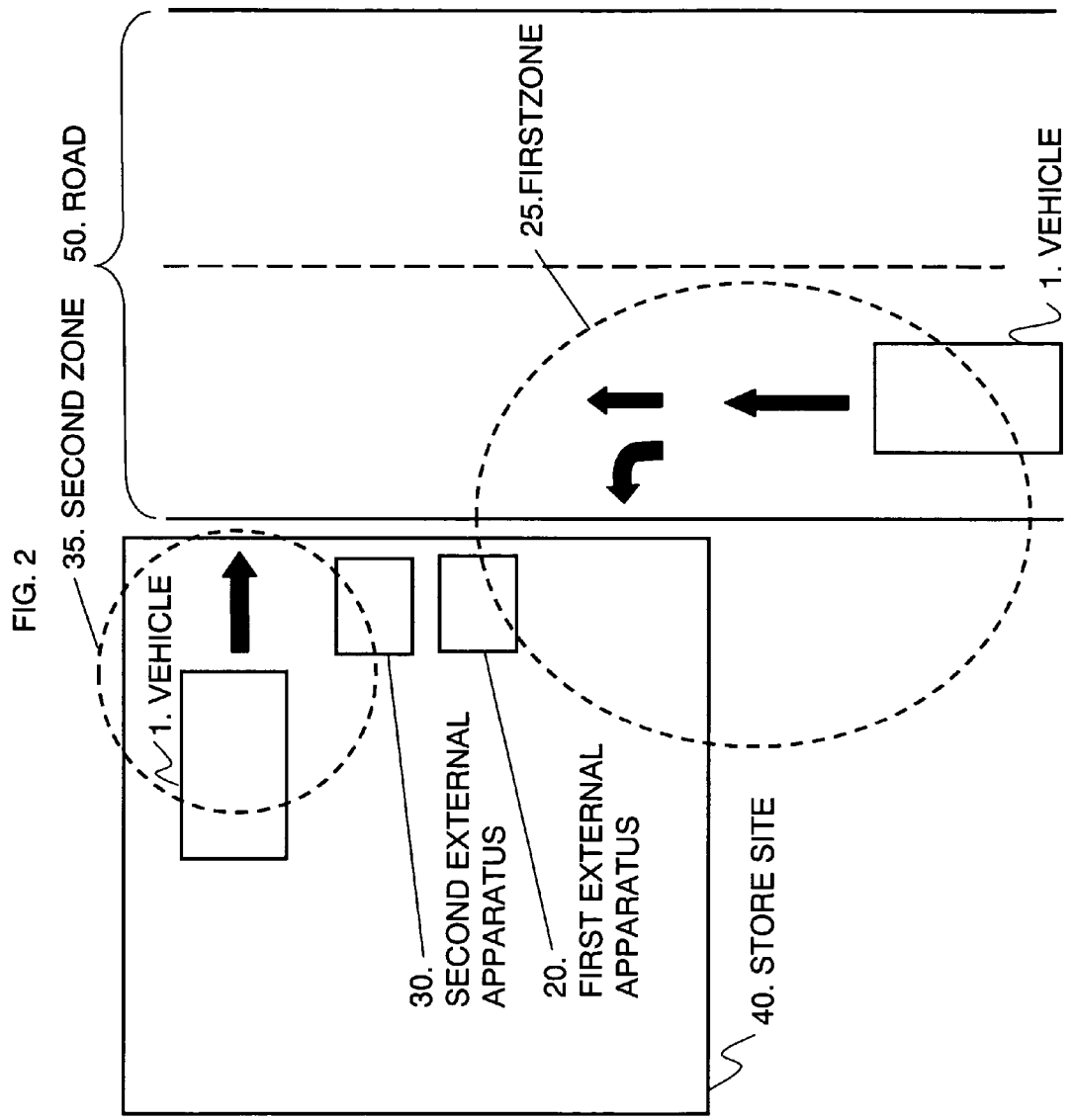
FIG. 2 is a figure showing the arrangement of the guidance system including the vehicle-mounted apparatus.
Figure 3:
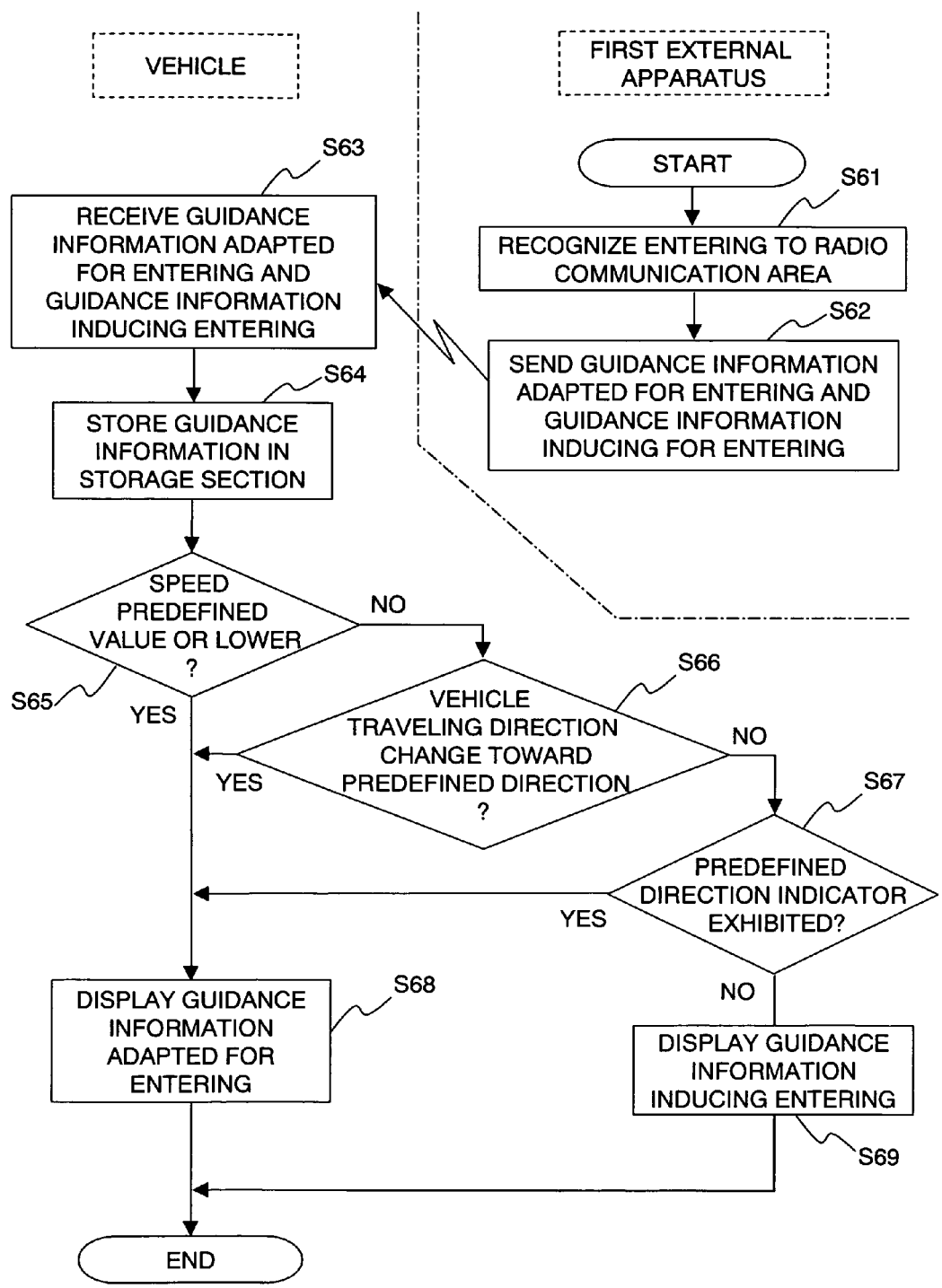
FIG. 3 is a flowchart showing the operation of the guidance system including the vehicle-mounted apparatus.

The guidance system including the vehicle-mounted apparatus configured as above is explained on its operation, by using FIGS. 2 and 3.

FIG. 2 is a figure showing the arrangement of the guidance system including the vehicle-mounted apparatus in the first embodiment of the invention. FIG. 3 is a flowchart showing the operation of the guidance system including the vehicle-mounted apparatus in the first embodiment of the invention.

When a vehicle 1 traveling a road 50 is on this side of an entrance (not shown) to a store site 40, the radio section 22 of the first external apparatus 20 recognizes that the communication apparatus 3 mounted on the vehicle 1 has entered a first zone 25 as a radio communication area of the first external apparatus 20, through the antenna 21 covering the first zone 25 (S61). Thereupon, the main processing section 24 sends, to the radio section 22, pieces of guidance information adapted for entering and guidance information adapted for not entering stored in the storage section 23, on the basis of the information from the radio section 22. The radio section 22 sends those toward/the communication apparatus 3 mounted on the vehicle 1 (S62).

The guidance-information acquiring section 13 of the vehicle-mounted apparatus 10 acquires the pieces of guidance information adapted for entering and guidance information adapted for not entering received by the communication apparatus 3 (S63). The main processing section 17 stores the pieces of guidance information adapted for entering and guidance information adapted for not entering acquired by the guidance-information acquiring section 13, to the storage section 14 (S64).

When the vehicle-mounted apparatus 10 acquires the guidance information from the first external apparatus 20, the determining section 12 determines a vehicle 1 movement on the basis of the vehicle sensor 2 signal inputted from the sensor-signal input section 11. The information selecting section 15 selects a suited piece of information and outputs it from the output section 16.

At first, it is determined whether or not the vehicle 1 speed is equal to or lower than a predefined value, from the signal concerning vehicle speed of the vehicle sensor 2 signal inputted by the sensor-signal input section 11 (S65). In the case the vehicle 1 speed is equal to or lower than the predefined value, the vehicle 1 in movement is determined expected to enter. However, in the case not equal to or lower than the predefined value, the process moves to a determination on traveling direction change.

By a signal concerning a traveling direction change inputted by the sensor-signal input section 11, determined is a traveling direction change of the vehicle (S66). In the case the change is in a predefined direction signifying to enter the store site 40, the vehicle in movement is determined expected to enter. In case not so, the process moves to a determination on the turn-signal (not shown). By a signal concerning the turn-signal inputted at the sensor-signal input section 11, it is determined whether a predefined turn-signal is exhibited or not (S67).

In the case the turn-signal is exhibited in the predefined direction signifying to enter the store site 40, the vehicle 1 in movement is determined expected to enter. However, in the case that the predefined direction indicator is not exhibited, the determining section 12 terminates the determination process.

The signal concerning a traveling direction change outputted from the vehicle sensor may be a signal the steering wheel is detected in its manipulation angle or a signal the vehicle is detected in the angular velocity of turning. Otherwise, another method is applicable.

The determining section 12 may successively receive signals from the sensor-signal input section 11, to determine a vehicle movement on the basis of the history information based on the received signal. For example, when low speed is continued in respect of vehicle speed, determination maybe made as a snarl occurrence and a determination not to consider expected for entering (no at step S65) may be added.

The information selecting section 15 selects the information to be outputted at the output section 16, on the basis of a determination result of vehicle 1 movement by the determining section 12. In the case the determining section 12 has determined vehicle 1 movement expected to enter, the information selecting section 15 selects guidance information adapted for entering as a subject of output. The output section. 16 outputs guidance information adapted for entering selected by the information selecting section 15 (S68).

In the case the determining section 12 has not determined vehicle 1 movement expected to enter, the information selecting section 15 selects guidance information adapted for not entering as a subject of output. The output section 16 outputs guidance information adapted for not entry selected by the information selecting section 15 (S69).

Meanwhile, in the case the vehicle 1 has moved from the store site 40 toward the road 50 and entered a second zone 35 as a radio communication area of the antenna 31 of the second external apparatus 30, guidance information adapted for leaving can be provided in place of the guidance information adapted for entering by the similar process to the vehicle entrance to the first zone 25.

As in the above, the vehicle-mounted apparatus in the first embodiment of the invention determines a vehicle movement depending upon a vehicle-sensor signal inputted from the sensor-signal input section and outputs guidance information adapted for that movement. Accordingly, based on the user's usual drive operation, it is possible to suitably provide a guidance adapted for entering or guidance information inducing for entering.

Meanwhile, the above embodiment explained on the case that the first external apparatus 20 has the antenna 21 covering the first zone 25 while the second external apparatus 30 has the antenna 31 covering the second zone 35. However, it is possible to apply an arrangement that one external apparatus has both an antenna covering the first zone 25 and an antenna covering the second zone 35 whereby the external apparatus determines with which antenna communications have been effected with the communication apparatus 3 mounted on the vehicle 1, to select a guidance concerning entering or a guidance concerning leaving and send it to the communication apparatus 3.

Meanwhile, in the above embodiment, explanation was on the case the determining section 12 determines expected to enter in any of the cases that vehicle 1 speed is equal to or lower than the predefined value, that vehicle traveling direction is changing to a predefined direction and that a predefined turn-signal is exhibited. However, the invention is not limited to this but can be similarly applied even with a determination under the condition in combination of two or three of these.

Figure 4:
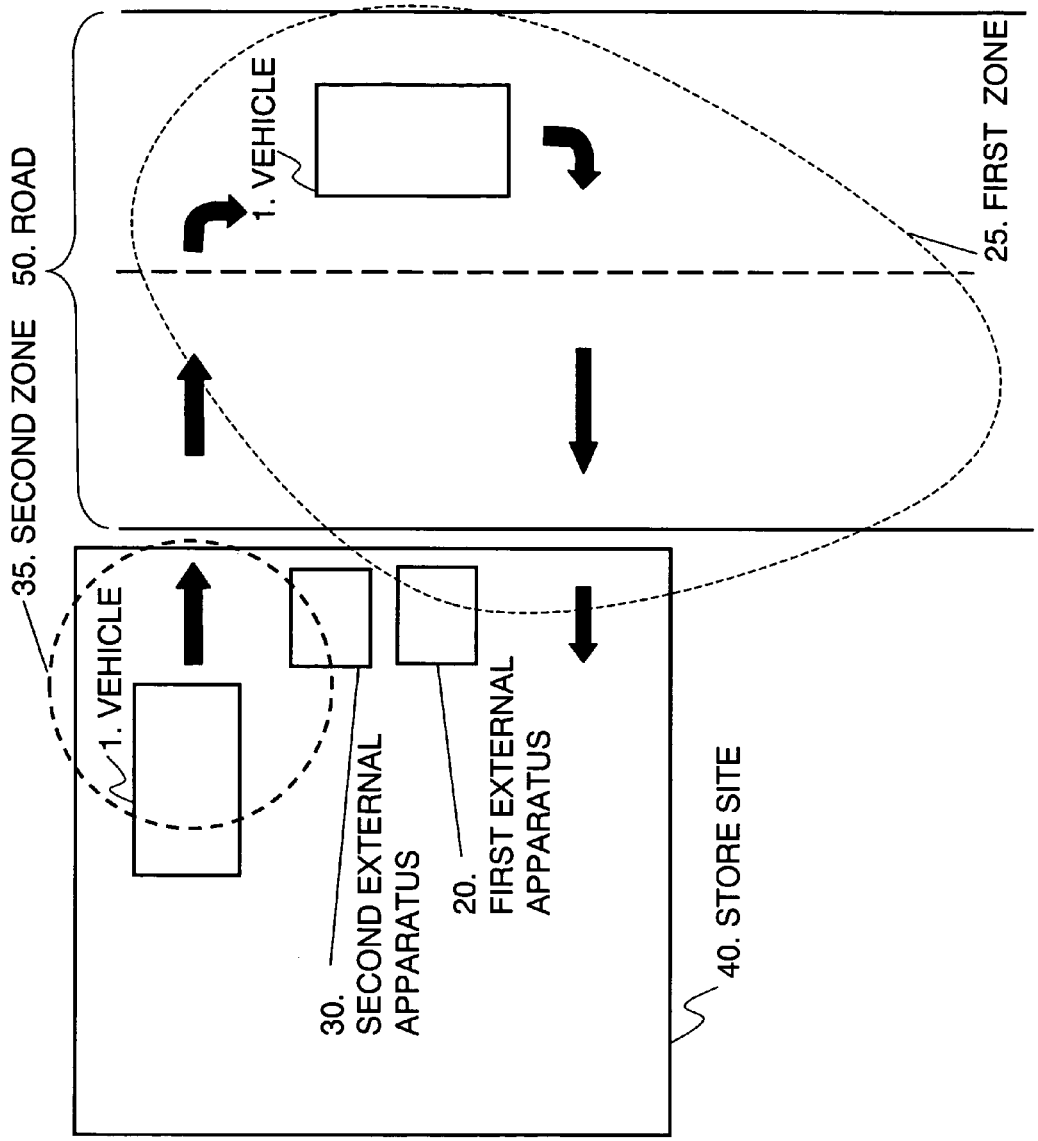
FIG. 4 is a figure showing another arrangement of the guidance system including the vehicle-mounted apparatus.

Meanwhile, vehicle-traveling heading direction may be added as information for the determining section 12 to determine a vehicle movement. In FIG. 4, when the upper of the figure is taken north, traveling in a direction of west is added as a condition for determining the first zone while traveling in a direction of east is added as a condition for determining the second zone. Due to this, application is possible similarly for the vehicle entering the store establishment 40 from the opposite lane and the vehicle exiting toward the opposite lane.

Meanwhile, the vehicle sensor 2 signal was explained on the case that inputting was directly to the sensor-signal input section 11. The invention is not limited to this but can be applied in the case, for example, input is made to another apparatus, such as a navigation apparatus, for providing a guidance to the vehicle 1 and then, after processing, input is made to the sensor-signal input section 11.

Meanwhile, this vehicle-mounted apparatus may possess a function as a navigation apparatus for providing route guidance. In such a case, it is possible to add own-vehicle position information received for route guidance to the vehicle movement determination.

Second Embodiment

Figure 5:
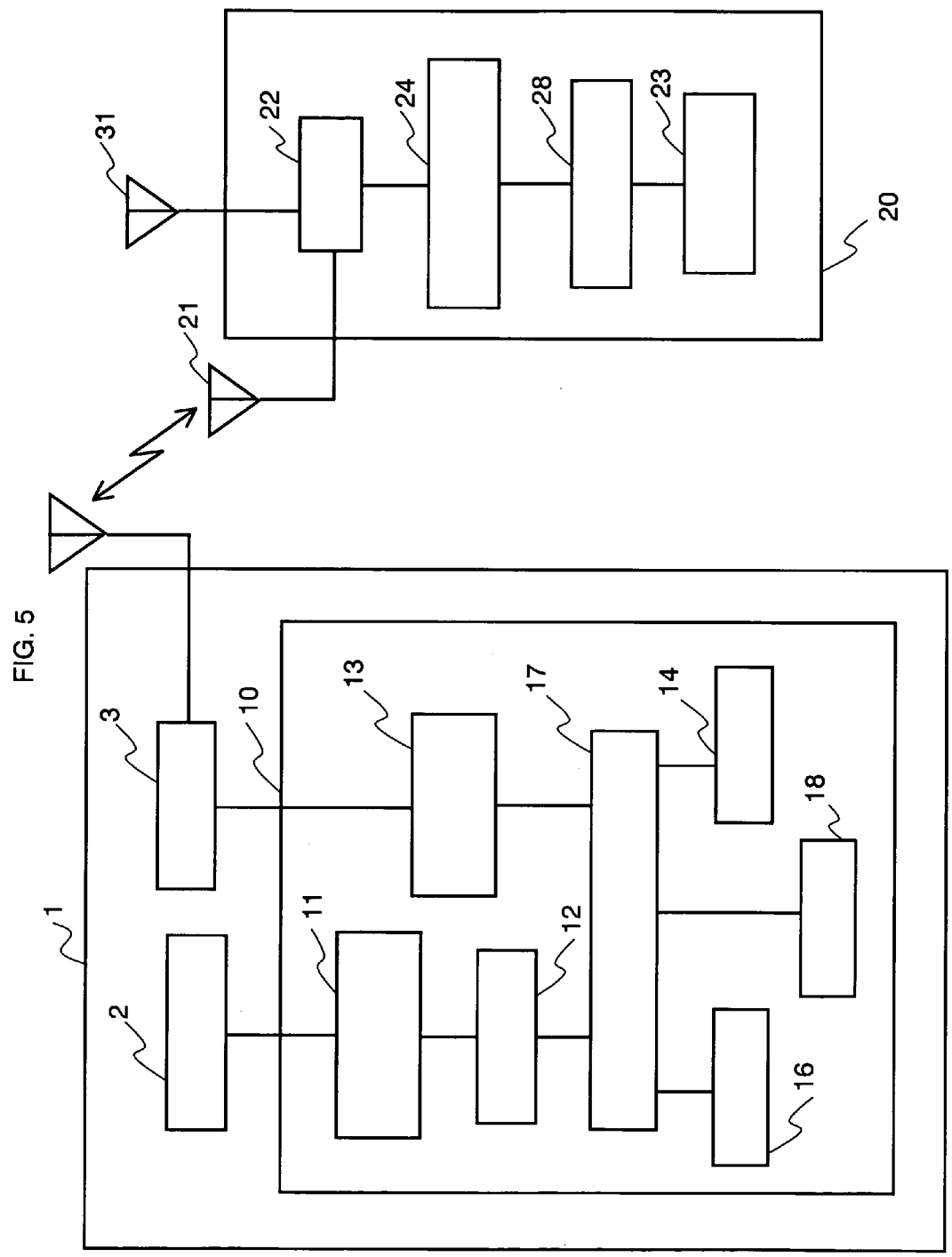
FIG. 5 is a block diagram of a guidance system including a vehicle-mounted apparatus in a second embodiment of the present invention.

FIG. 5 is a block diagram of a guidance system including a vehicle-mounted apparatus in a second embodiment of the invention. In FIG. 5, the same reference is used for the same arrangement as in FIG. 1, to omit explanation. In the guidance system of this embodiment, the information selecting section is provided on the first external apparatus 20 instead of on the vehicle-mounted apparatus 10. The first external apparatus 20 has both an antenna 21 covering a first zone 25 and an antenna 31 covering a second zone 35, and configured to cope with both a guidance for entering and a guidance for leaving.

The vehicle-mounted apparatus 10 has an ID managing section 18 for generating a vehicle ID identifying the vehicle. Based on the vehicle ID generated by the ID managing section 18 and stored in the storage section 14, unambiguously specified is a determination result of operation and guidance information based on determination result.

In the guidance system including the vehicle-mounted apparatus arranged as above, the operation is explained with using FIGS. 2, 6 and 7. FIGS. 6 and 7 are a flowchart showing the operation of the guidance system including the vehicle-mounted apparatus in the second embodiment of the invention. In FIG. 2, the present embodiment is different from the first embodiment in that the first external apparatus 20 has the antenna 21 covering the first zone 25 and the antenna 31 covering the second zone 35, to eliminate the necessity of the second external apparatus 30.

When the vehicle 1 traveling the road 50 is on this side of an entrance to the store site 40, the communication apparatus 3 mounted on the vehicle 1 recognizes to enter the first zone 25 as a radio communication area of the antenna 21 of the first external apparatus 20 (S71). Thereupon, the determining section 12 determines a vehicle 1 movement on the basis of a vehicle sensor 2 signal inputted from the sensor-signal input section 11 of the vehicle-mounted apparatus 10.

At first, it is determined whether or not the vehicle 1 speed inputted at the sensor-signal input section 11 is equal to or lower than a predefined value (S72). In the case the vehicle 1 speed is equal to or lower than the predefined value, vehicle 1 movement is determined expected to enter or expected to leave. In the case not equal to or lower than the predefined value, the process moves to a determination for traveling direction change. By a signal concerning traveling direction change inputted at the sensor-signal input section 11, determined is a traveling direction change of the vehicle (S73).

In the case that the change is a change in a predefined direction, the vehicle in movement is determined expected to enter or expected to leave. On the other hand, in case not a change in a predefined direction, the process moves to a determination on the direction indicator. By a signal of direction indicator inputted by the sensor-signal input section 11, it is determined whether a predefined direction indicator is exhibited or not (S74). In the case that a predefined direction indicator is exhibited, the vehicle 1 in movement is determined expected to enter or expected to leave. On the other hand, in the case that the predefined direction indicator is not exhibited; the determining section 12 terminates the determining process.

The main processing section 17, in the case the determining section 12 determines the vehicle 1 in movement expected to enter or expected to leave, sends a reception desire for guidance information adapted for entering or leaving to the first external apparatus 20 through the communication apparatus 3 (S75). On this occasion, the vehicle ID generated by the ID managing section 18 is sent together. Meanwhile, in the case not determined the vehicle 1 in movement expected to enter or expected to leave, a reception desire for guidance information adapted for not entering is sent to the external apparatus 20 through the communication apparatus 3 (S76). On this occasion, the vehicle ID generated by the ID managing section 18 is sent together.

When the radio section 22 of the first external apparatus 20 receives the guidance-information reception desire inducing for entering sent from the vehicle-mounted apparatus 10 through the communication apparatus 3 (S77), the vehicle ID is stored and confirmation is made as to whether the reception signal has been received at the antenna 21 or at the antenna 31 (S78).

The main processing section 24, when the antenna having received is the antenna 21, notifies the content the radio communication section has received to the information selecting section 28. The information selecting section 28 selects guidance information inducing for entering of among the guidance information stored in the storage section 23, and outputs it to the radio section 22 through the main processing section 24 by adding a stored vehicle ID (S79). On the other hand, when the antenna having received is the antenna 31, the operation is ended.

Meanwhile, when the radio section 22 of the first external apparatus 20 receives the guidance-information reception desire adapted for entering or leaving sent from the vehicle-mounted apparatus 10 through the communication apparatus 3 (S80), the vehicle ID is stored and confirmation is made as to whether the reception signal has been received at the antenna 21 or at the antenna 31 (S81).

The main processing section 24, when the antenna having received is the antenna 21, notifies the information selecting section 28 of a reception desire for guidance information adapted for entering. The information selecting section 28 selects guidance information adapted for entering of among the guidance information stored in the storage section 23, and outputs it to the radio 22 through the main processing section 24 by adding a stored vehicle ID (S82).

On the other hand, when the antenna having received is the antenna 31, the main processing section 24 notifies the information selecting section 28 of a reception desire for guidance information adapted for leaving. The information selecting section 28 selects guidance information adapted for leaving of among the guidance information stored in the storage section 23, and outputs it to the radio section 22 through the main processing section 24 (S83). The radio section 22 sends the guidance information the information selecting section 28 has selected toward the communication apparatus 3 of the vehicle 1 (S84).

The guidance-information acquiring section 13 of the vehicle-mounted apparatus 10, in the case the communication apparatus 3 acquires from the first external apparatus 20 guidance information received based on a vehicle ID (S85), confirms whether the received vehicle ID agrees with the vehicle ID stored in the storage section 14 (S86). In the case of agreement, storage is made to the storing section 14 and the output section 16 outputs in the form of voice, characters or images to the user the guidance information the guidance-information acquiring section 13 has acquired (S87).

Incidentally, the communication apparatus 3 may store a vehicle ID of a predetermined own vehicle and compare/confirm it with a received vehicle ID. Meanwhile, the vehicle ID generated by the ID managing section 18 may be stored and compared/confirmed with a vehicle ID received by the communication apparatus 3.

As described above, the vehicle-mounted apparatus in the second embodiment of the invention determines a vehicle movement on the basis of a vehicle-sensor signal inputted from the sensor-signal input section, and outputs guidance information adapted for that movement. Accordingly, a guide adapted for entering or guide information inducing for entering can be properly provided on the basis of user's usual drive actions.

Incidentally, in this embodiment, explanation was with the case that a plurality of vehicles, when entering the first or second zone, could be identified because the vehicles are identified by vehicle IDs. The invention is not limited to this. Where the first or second zone is restricted in size not to cause the possibility that a plurality of vehicles enter at the same time, application is possible without identifying the vehicles by a vehicle ID.

INDUSTRIAL APPLICABILITY

As in the above, the vehicle-mounted apparatus according to the present invention determines a vehicle movement depending upon a vehicle-sensor signal inputted from the sensor-signal input means and outputs guidance information adapted for a determined vehicle movement, thereby having an effect that a guidance adapted for entering or guidance information inducing for entering can be properly provided on the basis of user's usual drive actions. It is useful as a vehicle-mounted apparatus or the like for outputting the guidance information acquired from an external apparatus through the use of radio communications.

What is claimed is:

1. A vehicle-mounted apparatus comprising: sensor-signal input means for inputting a vehicle-sensor signal for acquiring a vehicle status; determining means for determining a movement of the vehicle on the basis of the vehicle-sensor signal inputted from the sensor-signal input means; guidance-information acquiring means for acquiring guidance information from an external apparatus through a communication apparatus mounted on the vehicle; information selecting means for selecting guidance information acquired by the guidance-information acquiring means, depending upon a vehicle movement determined by the determining means; and an output means for outputting guidance information selected by the information selecting means.

2. A vehicle-mounted apparatus according to claim 1, wherein the determining means determines a vehicle movement expected to enter or expected to leave, in a case of recognition of at least one of a traveling at a predetermined speed or lower, a change in traveling direction to a predetermined direction and an exhibition of a turn-signal in a predetermined direction.

3. A vehicle-mounted apparatus according to claim 2, wherein, in a case the determining means determines a vehicle movement expected to enter or expected to leave, guidance information outputted by the output means is guidance information adapted to enter or leave.

4. A vehicle-mounted apparatus according to claim 3, wherein whether the guidance information is guidance information adapted for entering or information adapted for leaving is determined based on an area in which the external apparatus is allowed to communicate with the communication apparatus or the transmission apparatus.

5. A vehicle-mounted apparatus according to claim 2, wherein, in a case the determining means does not determine a vehicle movement expected to enter or expected to leave, guidance information outputted by the output means is guidance information adapted not to enter or not to leave.

6. A vehicle-mounted apparatus comprising: sensor-signal input means for inputting a vehicle-sensor signal for acquiring a vehicle status; determining means for determining a movement of the vehicle on the basis of the vehicle-sensor signal inputted from the sensor-signal input means; movement presenting means for presenting to the external apparatus a vehicle movement determined by the determining means through a transmission apparatus mounted on the vehicle; guidance-information acquiring means for acquiring guidance information sent by the external apparatus on the basis of a vehicle movement presented by the movement presenting means through a receiving apparatus mounted on the vehicle; and an output means for outputting guidance information acquired by the guidance-information acquiring means.

7. A vehicle-mounted apparatus according to claim 6, wherein the determining means determines a vehicle movement expected to enter or expected to leave, in a case of recognition of at least one of a traveling at a predetermined speed or lower, a change in traveling direction to a predetermined direction and an exhibition of a turn-signal in a predetermined direction.

8. A vehicle-mounted apparatus according to claim 7, wherein, in a case the determining means determines a vehicle movement expected to enter or expected to leave, guidance information outputted by the output means is guidance information adapted to enter or leave.

9. A vehicle-mounted apparatus according to claim 8, wherein whether the guidance information is guidance information adapted for entering or information adapted for leaving is determined based on an area in which the external apparatus is allowed to communicate with the communication apparatus or the transmission apparatus.

10. A vehicle-mounted apparatus according to claim 7, wherein, in a case the determining means does not determine a vehicle movement expected to enter or expected to leave, guidance information outputted by the output means is guidance information adapted not to enter or not to leave.

11. A guidance system including at least a vehicle-mounted apparatus and an external apparatus for carrying out communications with the vehicle-mounted apparatus, the guidance system wherein the vehicle-mounted apparatus comprises: sensor-signal input means for inputting a vehicle-sensor signal for acquiring a vehicle status; determining means for determining a movement of the vehicle on the basis of the vehicle-sensor signal inputted from the sensor-signal input means; guidance-information acquiring means for acquiring guidance information from an external apparatus through a communication apparatus mounted on the vehicle; information selecting means for selecting guidance information acquired by the guidance-information acquiring means, depending upon a vehicle movement determined by the determining means; and an output means for outputting guidance information selected by the information selecting means;

the external apparatus having transmitting means for sending the guidance information to the vehicle-mounted apparatus and control means for controlling the transmitting means.

12. A guidance system including at least a vehicle-mounted apparatus and an external apparatus for communications with the vehicle-mounted apparatus, the guidance system wherein the vehicle-mounted apparatus comprises: sensor-signal input means for inputting a vehicle-sensor signal for acquiring a vehicle status; determining means for determining a movement of the vehicle on the basis of the vehicle-sensor signal inputted from the sensor-signal input means; movement presenting means for presenting to the external apparatus a vehicle movement determined by the determining means through a transmission apparatus mounted on the vehicle; guidance-information acquiring means for acquiring guidance information sent by the external apparatus on the basis of a vehicle movement presented by the movement presenting means through a receiving apparatus mounted on the vehicle; and an output means for outputting guidance information acquired by the guidance-information acquiring means;

the external apparatus having receiving means for receiving the vehicle movement presented by the movement presenting means, information selecting means for selecting guidance information depending upon a vehicle movement received by the receiving means and transmitting means for sending guidance information the information selecting means has selected.

* * * * *